(12) United States Patent
Montalvo

(10) Patent No.: US 11,176,568 B1
(45) Date of Patent: Nov. 16, 2021

(54) MACHINE LEARNING DIGITAL PROMOTION PROCESSING SYSTEM BASED UPON LOW-FREQUENCY AND HIGH-FREQUENCY DATA AND RELATED METHODS

(71) Applicant: Inmar Clearing, Inc., Winston-Salem, NC (US)

(72) Inventor: Gregory Montalvo, Durham, NC (US)

(73) Assignee: INMAR CLEARING, INC., Winston-Salem, NC (US)

( * ) Notice: Subject to any disclaimer, the term of this patent is extended or adjusted under 35 U.S.C. 154(b) by 2 days.

(21) Appl. No.: 16/679,750

(22) Filed: Nov. 11, 2019

(51) Int. Cl.
*G06Q 30/02* (2012.01)
*G06N 20/00* (2019.01)

(52) U.S. Cl.
CPC ......... *G06Q 30/0224* (2013.01); *G06N 20/00* (2019.01); *G06Q 30/0222* (2013.01); *G06Q 30/0226* (2013.01)

(58) Field of Classification Search
CPC .................................................. G06Q 30/02
See application file for complete search history.

(56) References Cited

U.S. PATENT DOCUMENTS

| | | | | |
|---|---|---|---|---|
| 2003/0154163 A1* | 8/2003 | Phillips | ............... | G06Q 30/0234 705/39 |
| 2005/0071223 A1* | 3/2005 | Jain | ..................... | G06Q 30/0235 705/14.13 |
| 2006/0047563 A1* | 3/2006 | Wardell | ................. | G06Q 30/02 705/14.67 |
| 2007/0078869 A1 | 4/2007 | Carr et al. | | |
| 2007/0267479 A1* | 11/2007 | Nix | .......................... | G07F 17/24 235/379 |
| 2011/0258049 A1* | 10/2011 | Ramer | ............... | G06Q 30/0273 705/14.66 |
| 2012/0054302 A1* | 3/2012 | Priyadarshan | ......... | G06Q 30/02 709/217 |
| 2012/0123844 A1* | 5/2012 | Fano | .................. | G06Q 30/0251 705/14.25 |
| 2013/0054333 A1* | 2/2013 | Ross | ...................... | G06Q 30/02 705/14.25 |
| 2013/0124281 A1* | 5/2013 | Evans | ................ | G06Q 30/0213 705/14.13 |

(Continued)

*Primary Examiner* — Vincent M Cao
(74) *Attorney, Agent, or Firm* — Allen, Dyer, Doppelt + Gilchrist, P.A.

(57) ABSTRACT

A digital promotion system may include a user device and a digital promotion processing server. The digital promotion processing server is configured to repeatedly obtain low-frequency purchase data associated with a given user for a first category of purchases, and repeatedly obtain high-frequency purchase data associated with the given user for a second category of purchases different than the first category of purchases. The high-frequency purchase data may represent a greater number of purchases made in a given time period relative to the low-frequency purchase data. The digital promotion processing server is also configured to use machine learning to generate a current loyalty indicator based upon the repeatedly-obtained low-frequency purchase data and based upon the repeatedly-obtained high-frequency purchase data, and generate a digital promotion based upon the current loyalty indicator and communicate the digital promotion to the user device.

19 Claims, 9 Drawing Sheets

(56) References Cited

U.S. PATENT DOCUMENTS

| | | | | |
|---|---|---|---|---|
| 2014/0278859 A1* | 9/2014 | Gallucci | ............ | G06Q 30/0214 |
| | | | | 705/14.16 |
| 2014/0365314 A1* | 12/2014 | Torrens | .............. | G06Q 30/0207 |
| | | | | 705/14.66 |
| 2015/0186908 A1* | 7/2015 | Taskin | ................ | G06Q 30/0204 |
| | | | | 705/7.33 |
| 2016/0314528 A1* | 10/2016 | Abbott | ............... | G06Q 30/0269 |

* cited by examiner

MACHINE LEARNING DIGITAL PROMOTION PROCESSING SYSTEM BASED UPON LOW-FREQUENCY AND HIGH-FREQUENCY DATA AND RELATED METHODS

TECHNICAL FIELD

The present application relates to the field of electronics, and, more particularly, to digital promotion systems, and related methods.

BACKGROUND

Sales of a particular product or service may be based upon how well that product or service is marketed to a consumer. One form of marketing is a coupon, typically in paper form, for a discount toward the product or service. Some coupons may be retailer-specific, for example, only redeemable for the discount at a particular retailer, while other coupons may be product-specific from a manufacturer and redeemable at any retailer.

A coupon, while typically in paper form, may be in digital form and may be referred to as a digital promotion. A digital promotion may be selected or "clipped" via a mobile phone and saved to a digital wallet for redemption at a point-of-sale (POS) terminal, for example. A typical coupon is applicable to a given product and has a redeemable value that may vary based upon the quantity of a given item, for example, brand of item, size of the product in terms of packaging, and/or the price point of the given item. A typical coupon may also be redeemable only at a given retailer and/or within a threshold time period.

SUMMARY

A digital promotion system may include a user device and a digital promotion processing server. The digital promotion processing server is configured to repeatedly obtain low-frequency purchase data associated with a given user for a first category of purchases, and repeatedly obtain high-frequency purchase data associated with the given user for a second category of purchases different than the first category of purchases. The high-frequency purchase data may represent a greater number of purchases made in a given time period relative to the low-frequency purchase data. The digital promotion processing server is also configured to use machine learning to generate a current loyalty indicator based upon the repeatedly-obtained low-frequency purchase data and based upon the repeatedly-obtained high-frequency purchase data, and generate a digital promotion based upon the current loyalty indicator and communicate the digital promotion to the user device.

The first category of purchases may include automotive-related purchases. The second category of purchases may include grocery-related purchases, for example.

The first category of purchases may include medical-related purchases. The second category of purchases may include grocery-related purchases, for example.

The digital promotion processing server may be configured to repeatedly obtain the low-frequency purchase data from at least one point-of-sale (POS) terminal, for example. The digital promotion processing server may be configured to repeatedly obtain the high-frequency purchase data from at least one POS terminal. The digital promotion may have a value based upon the current loyalty indicator, for example.

A method aspect is directed to a method of processing a digital promotion. The method may include using a digital promotion processing server to repeatedly obtain low-frequency purchase data associated with a given user for a first category of purchases, and repeatedly obtain high-frequency purchase data associated with the given user for a second category of purchases different than the first category of purchases. The high-frequency purchase data may represent a greater number of purchases made in a given time period relative to the low-frequency purchase data. The method may also include using the digital promotion processing server to use machine learning to generate a current loyalty indicator based upon the repeatedly-obtained low-frequency purchase data and based upon the repeatedly-obtained high-frequency purchase data, and generate a digital promotion based upon the current loyalty indicator and communicate the digital promotion to a user device.

A computer readable medium aspect is directed to a non-transitory computer readable medium for processing a digital promotion. The non-transitory computer readable medium includes computer executable instructions that when executed by a processor cause the processor to perform operations. The operations may include repeatedly obtaining low-frequency purchase data associated with a given user for a first category of purchases and repeatedly obtaining high-frequency purchase data associated with the given user for a second category of purchases different than the first category of purchases. The high-frequency purchase data may represent a greater number of purchases made in a given time period relative to the low-frequency purchase data. The operations may also include using machine learning to generate a current loyalty indicator based upon the repeatedly-obtained low-frequency purchase data and based upon the repeatedly-obtained high-frequency purchase data and generating a digital promotion based upon the current loyalty indicator and communicating the digital promotion to a user device.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime and multiple prime notation are used to indicate similar elements in alternative embodiments.

Figure 1:
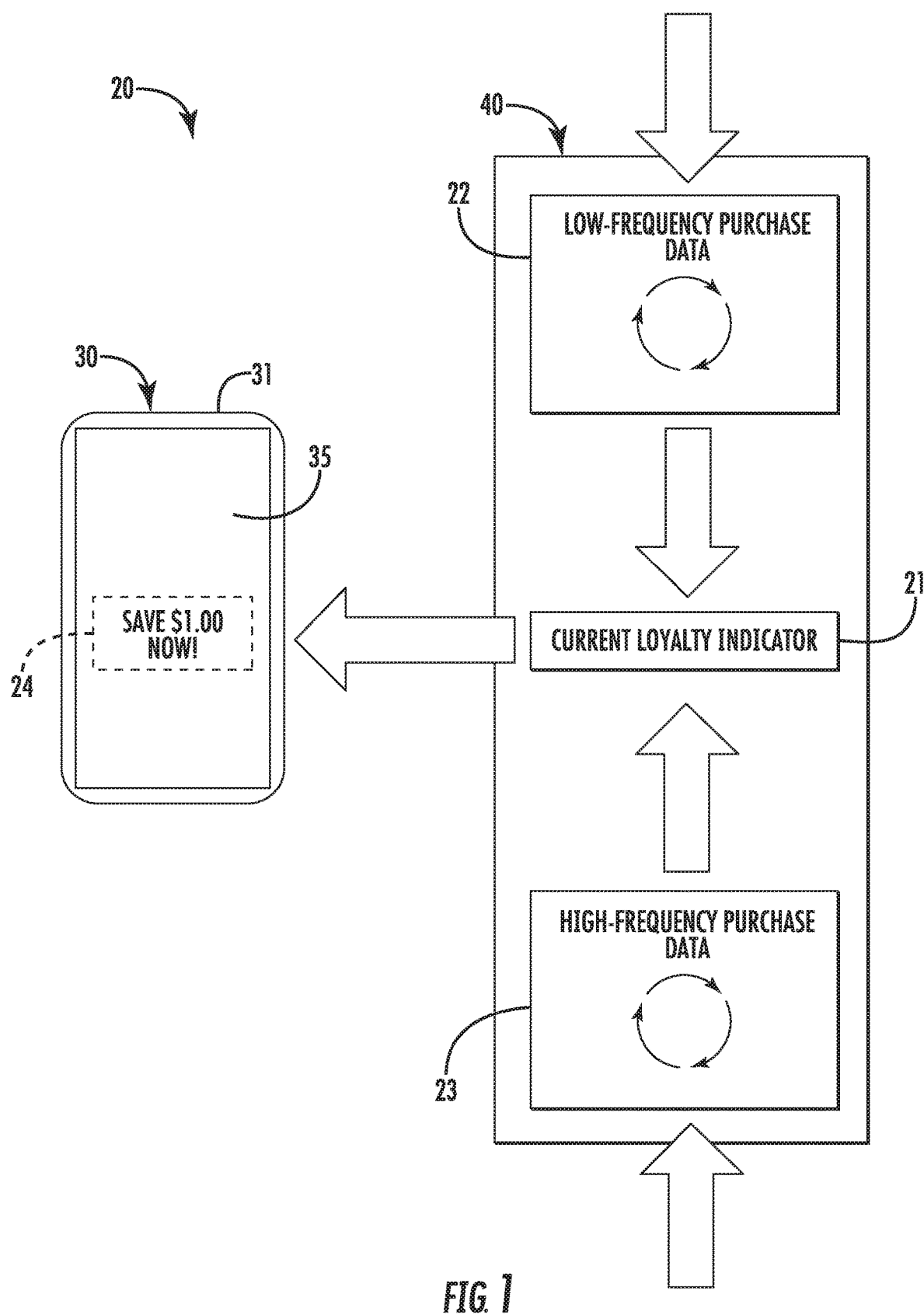
FIG. 1 is a schematic diagram of a digital promotion system in accordance with an embodiment.
Figure 2:
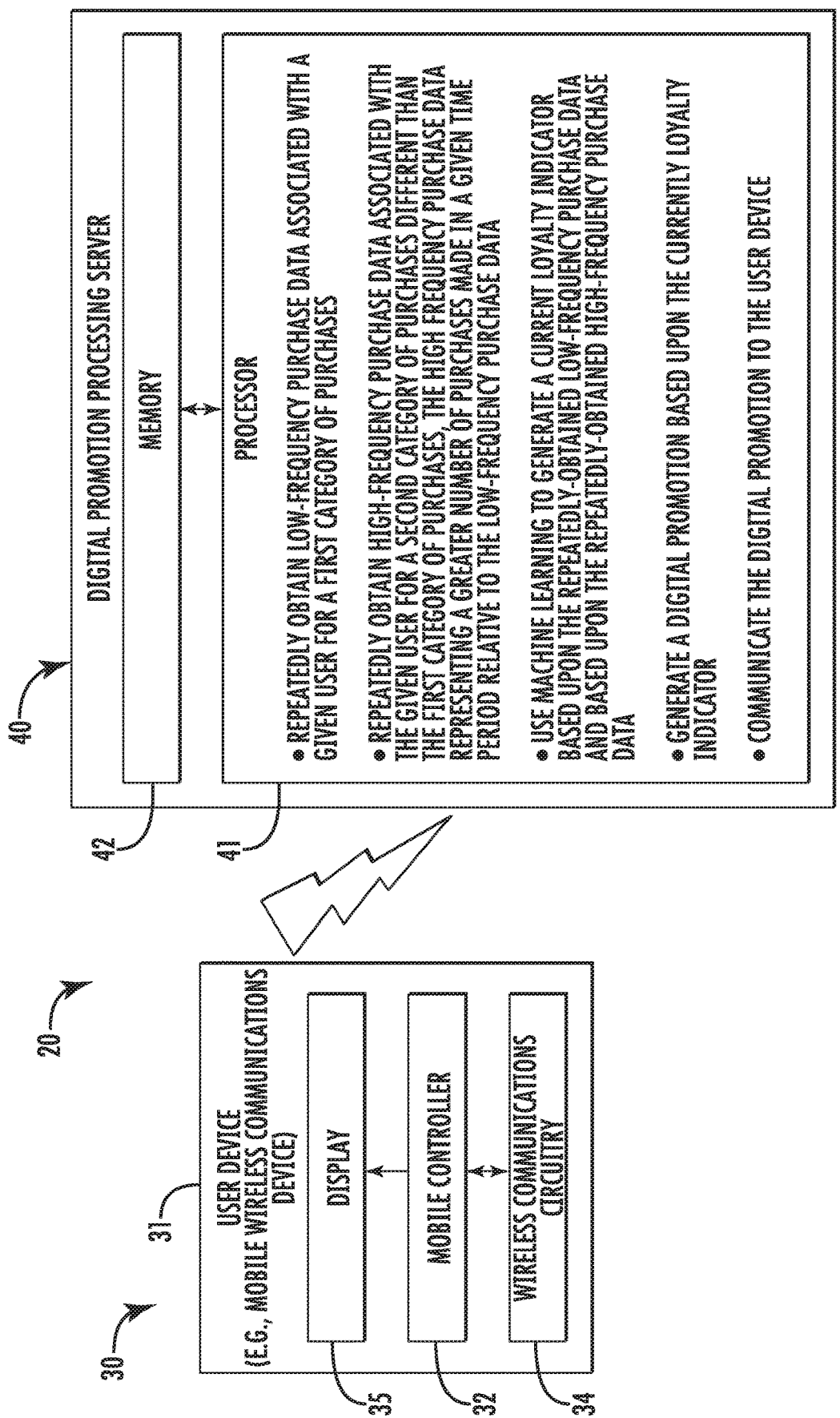
FIG. 2 is a schematic block diagram of the system of FIG. 1.

Referring initially to FIGS. 1-2, a digital promotion processing system 20 includes a user device that is illustratively in the form of a mobile wireless communications device 30. The mobile wireless communications device 30 illustratively includes a portable housing 31, a mobile controller 32, and wireless communications circuitry 34 coupled to the mobile device controller. The mobile wireless communications device 30 also includes a display 35, such as, for example, a touch display, carried by the portable housing 31 and coupled to the mobile device controller 32. The mobile wireless communications device 30 may include one or more input devices, for example, a camera and other types of input or output devices. The mobile wireless communications device 30 may be a mobile phone or smartphone, a tablet computer, or other type of mobile wireless communications device, as will be appreciated by those skilled in the art.

The promotions processing system 20 also includes a digital promotion processing server 40 communicatively coupled to the mobile wireless communications device 30. The digital promotion processing server 40 includes a processor 41 and a memory 42 associated with the processor.

Figure 3:
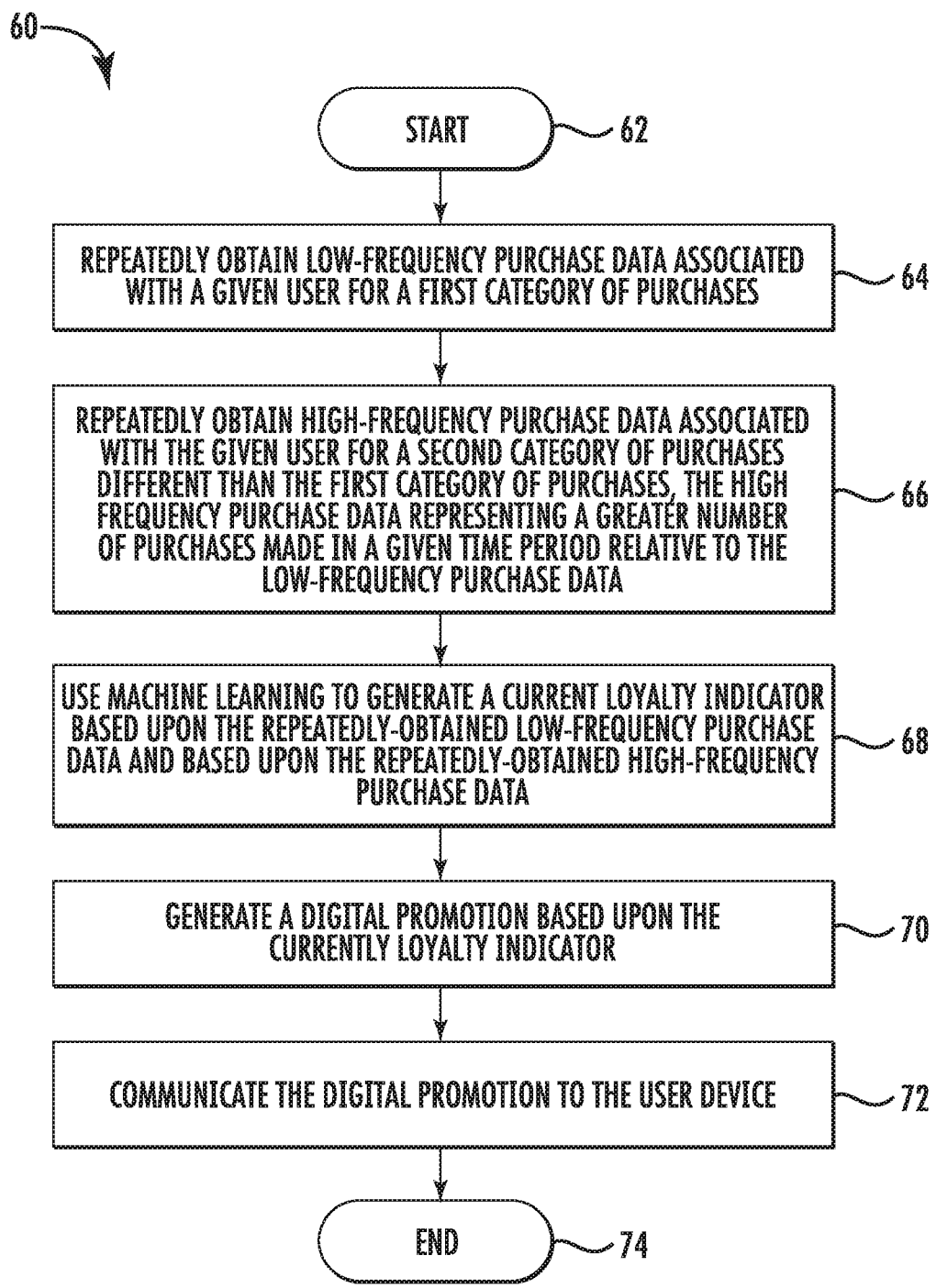
FIG. 3 is a flow chart illustrating operation of the digital promotion processing server of FIG. 2.

Referring now additionally to the flowchart 60 in FIG. 3, beginning at Block 62, operations of the digital promotion processing system 20 with respect to the digital promotion processing server 40 will now be described. At Block 64, the digital promotion processing server 40 repeatedly obtains low-frequency purchase data 22 associated with a given user for a first category of purchases. The digital promotion processing server 40, at Block 66, repeatedly obtains high-frequency purchase data 23 associated with the given user for a second category of purchases different than the first category of purchases. The high-frequency purchase data 23 may be obtained in parallel with the low-frequency purchase data 22. The high-frequency purchase data 23 represents a greater number of purchases made in a given time period relative to the low-frequency purchase data 22. For example, high-frequency purchase data may include data associated with certain purchases made on a weekly or greater frequency, while low-frequency purchase data may include data associated with certain purchases made on a quarterly basis or less frequent.

At Block 68, the digital promotion processing server 40 uses machine learning to generate a current loyalty indicator 21 based upon the repeatedly-obtained low-frequency purchase data 22 and based upon the repeatedly-obtained high-frequency purchase data 23. The digital promotion processing server 40, at Block 70, generates a digital promotion 24, e.g., a digital coupon, rebate, or redeemable value, based upon the current loyalty indicator 21 and, at Block 72, communicates the digital promotion to the user device 30. Operations end at Block 74.

Figure 4:
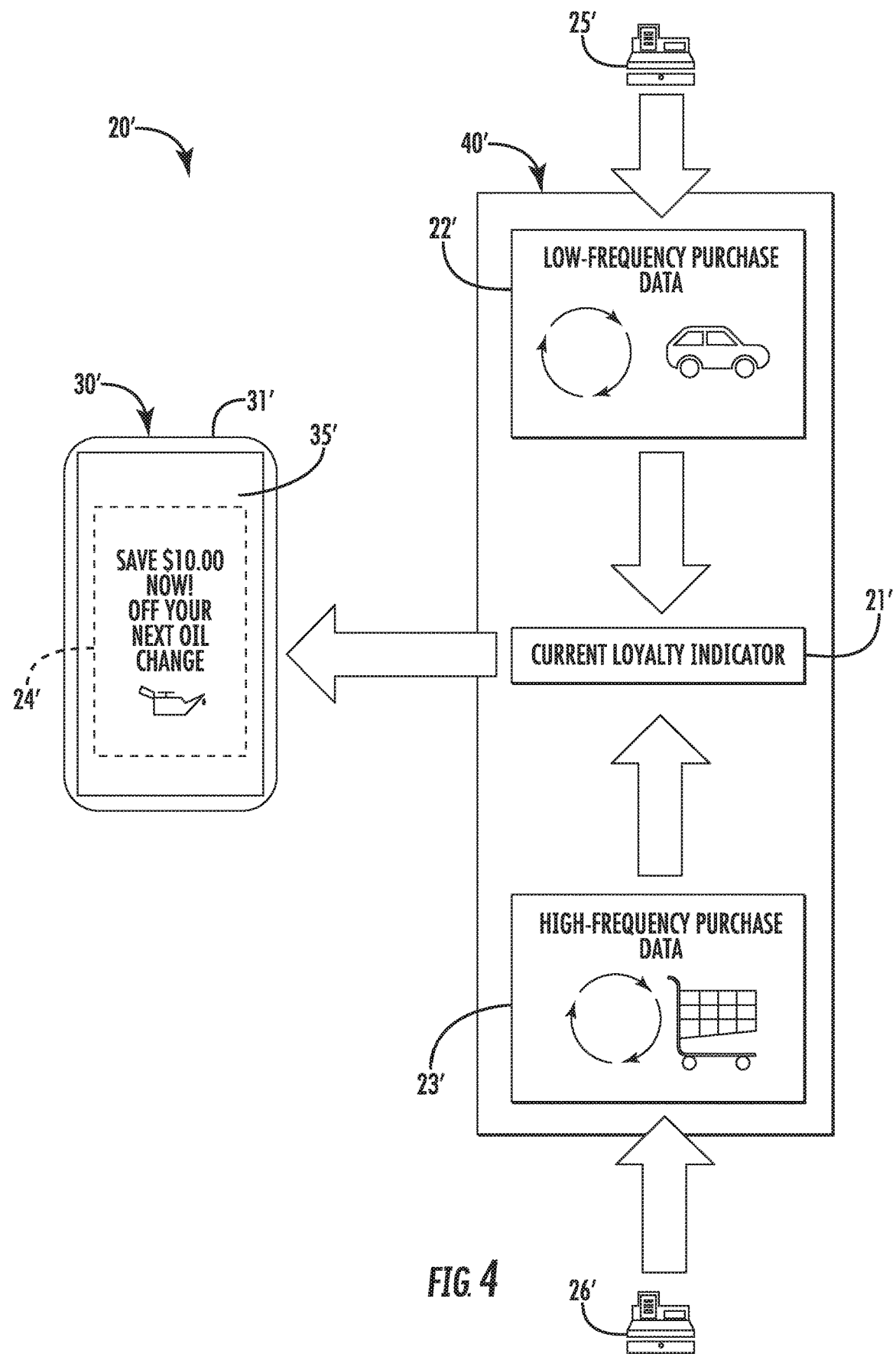
FIG. 4 is a more detailed schematic diagram of an exemplary implementation of a digital promotion system in accordance with embodiment.
Figure 5:
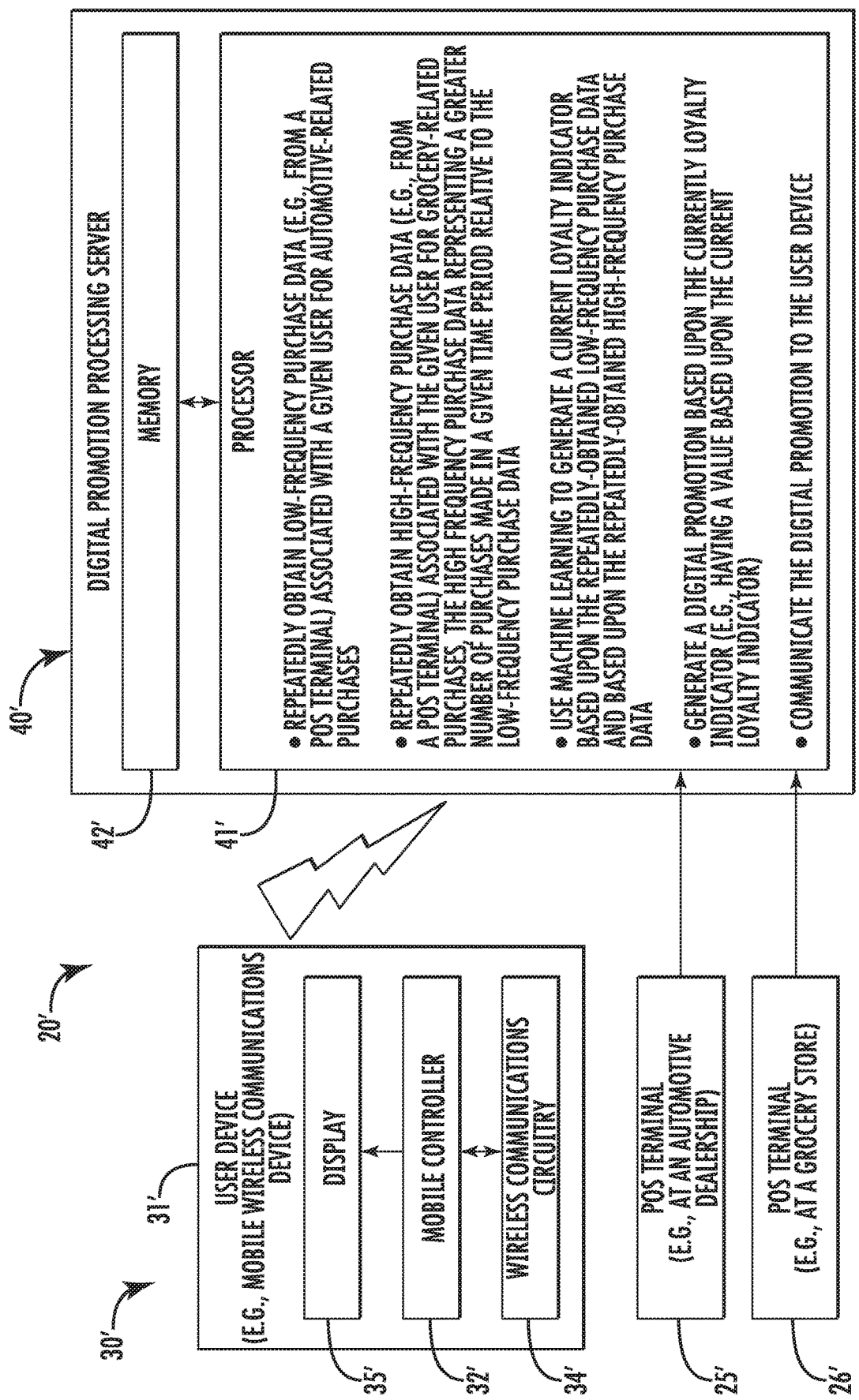
FIG. 5 is a schematic block diagram of the system of FIG. 4.
Figure 6:
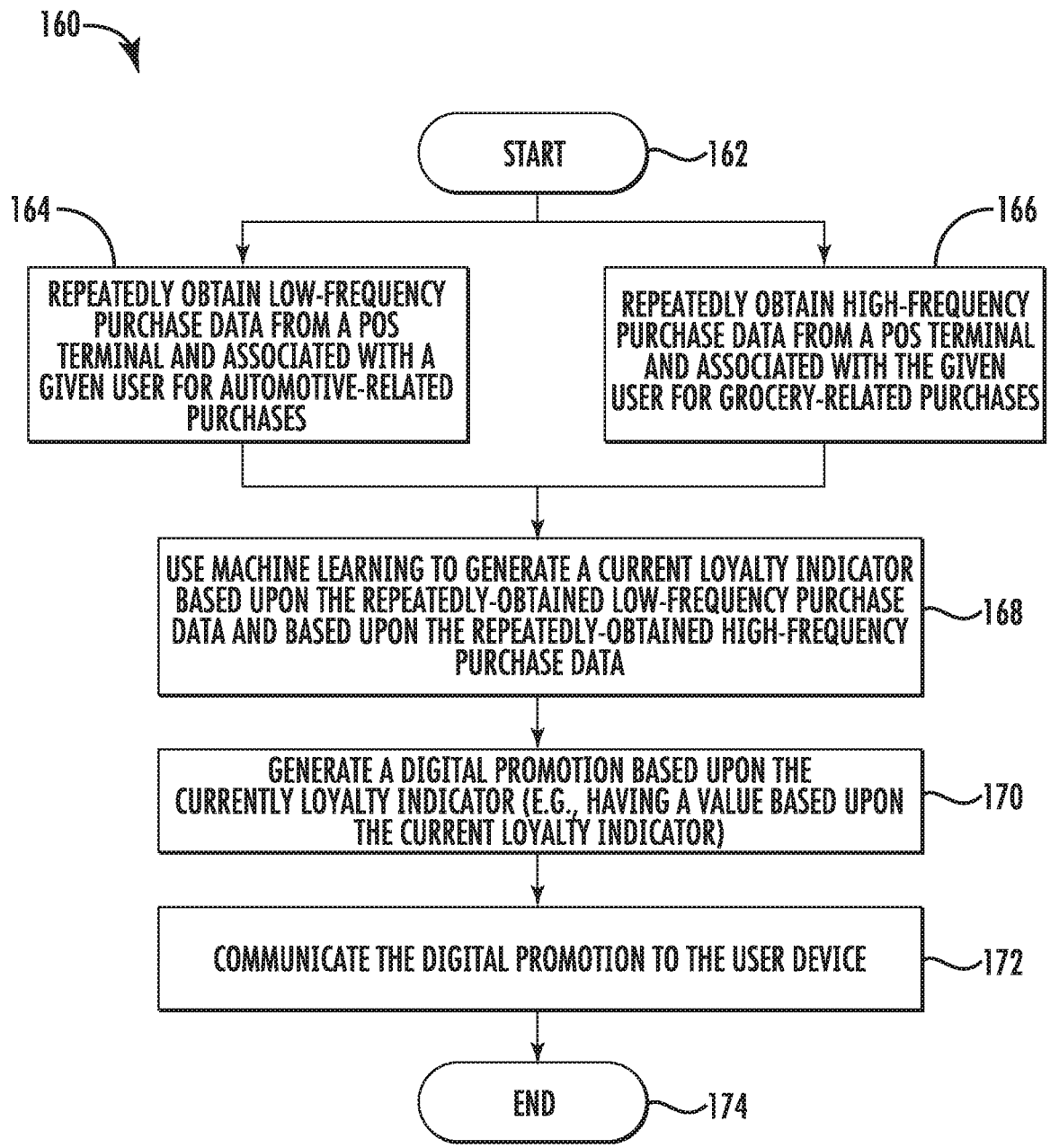
FIG. 6 is a flow chart illustrating operation of the digital promotion processing server of FIG. 5.

Referring now to FIGS. 4-5 and the flowchart 160 in FIG. 6, beginning at Block 162, more detailed operations of the digital promotion processing system 20' with respect to an exemplary embodiment of the digital promotion processing server 40' will now be described. At Block 164, the digital promotion processing server 40' repeatedly obtains (e.g., on a per-visit or per-purchase basis) low-frequency purchase data 22' associated with a given user for a first category of purchases. More particularly, the first category of purchases includes automotive-related purchases, which are typically made three or less times in a given year. Accordingly, the low-frequency purchase data 22' for automotive-related purchases may include a make, model, year, and purchase price of a user's automotive purchase, for example, from a dealership. The low-frequency purchase data 22' may also include post automobile purchase services and/or products, for example, oil change, alignment, repair, and lifestyle product purchases (e.g., the recency, frequency and/or value of the products and/or services), the data of such transaction may be obtained from a point-of-sale (POS) terminal 25' at an automotive dealership, for example.

In some embodiments, the digital promotion processing server 40' may determine a user form of communications based upon the low-frequency purchase data. For example, those users whose visits are more frequent or whose low-frequency purchase data 22' is associated with a technologically advanced automobile or automotive accessory, the digital promotion processing server 40' may determine the user form of communications to be a short-message-service (SMS) messages, chatbot communications within a social media application, and/or email. In other words, the low-frequency purchase data 22' may be mapped to particular user communication preferences, e.g., using machine learning.

The digital promotion processing server 40', at Block 166, repeatedly obtains (e.g., on a per-visit or per-purchase basis) high-frequency purchase data 23' associated with the given user for a second category of purchases different than the first category of purchases. The high-frequency purchase data 23' represents a greater number of purchases made in a given time period relative to the low-frequency purchase data. More particularly, the second category of purchases includes grocery-related purchases, which are typically made on a weekly basis or more frequent. The high-frequency purchase data 23' associated with the grocery-related purchases may be obtained from a POS terminal 26' at a grocery store, for example, and be associated with the user by way of a loyalty account identifier or other identifier. The high-frequency purchase data 23' may include information about purchased products, such as, for example, product description, price, product identifier, quantity, etc.

At Block 168, the digital promotion processing server 40' uses machine learning to generate a current loyalty indicator 21' based upon the repeatedly-obtained low-frequency purchase data 22' and based upon the repeatedly-obtained high-frequency purchase data 23'. More particularly, the digital promotion processing server 40' may learn correlations between the grocery-related purchases and the automotive-related purchases. For example, the current loyalty indicator 21' may be representative of a how likely the given user is to purchase automotive services or products, at what value, and with what level of loyalty. Through learning of patterns of grocery shopping and, for example, by way of the brands, types, pricing, and quantity of items purchased at a grocery store, the digital promotion processing server 40' may determine how likely the given user is to purchase automotive product and/or services. The current loyalty indicator 21' may be updated by the digital promotion processing server 40' repeatedly, similar to the low-frequency and high-frequency purchase data 22', 23'. Those skilled in the art will recognize that by repeatedly obtaining the low-frequency and high-frequency purchase data, and based upon the machine learning, the currently loyalty indicator is being updated, for example, periodically, continually, and/or on a per purchase basis.

The digital promotion processing server 40', at Block 170, generates a digital promotion 24', e.g., a digital coupon, rebate, or redeemable value, such as redeemable points, based upon the current loyalty indicator 21'. The digital promotion processing server 40' may determine a value of the digital promotion 24' based upon the current loyalty indicator. For example, a currently loyalty score that is representative (e.g., higher) of a more loyal user or a user more likely to purchase automotive products or services may receive a digital promotion having a higher redeemable value. The digital promotion processing server 40' may alternatively generate the digital promotion 24' to have a lower redeemable value since the given user is more likely to purchase the automotive products or services.

Still further, the digital promotion processing server 40' may generate the digital promotion 24' to be redeemable toward a particular product or service based upon the current loyalty indicator. For example, the digital promotion processing server 40' may generate a digital promotion 24' that is for a higher valued product or service for a user that has a current loyalty indicator indicative that the user is more likely to purchase the automotive products or services.

The digital promotion processing server 40', at Block 172 communicates the digital promotion 24' to the user device or mobile wireless communications device 30'. The digital promotion processing server 40' may communicate the digital promotion 24' based upon the determined user form of communications, e.g., wirelessly via chatbot, application, SMS message, email, etc.). Operations end at Block 174.

Figure 7:
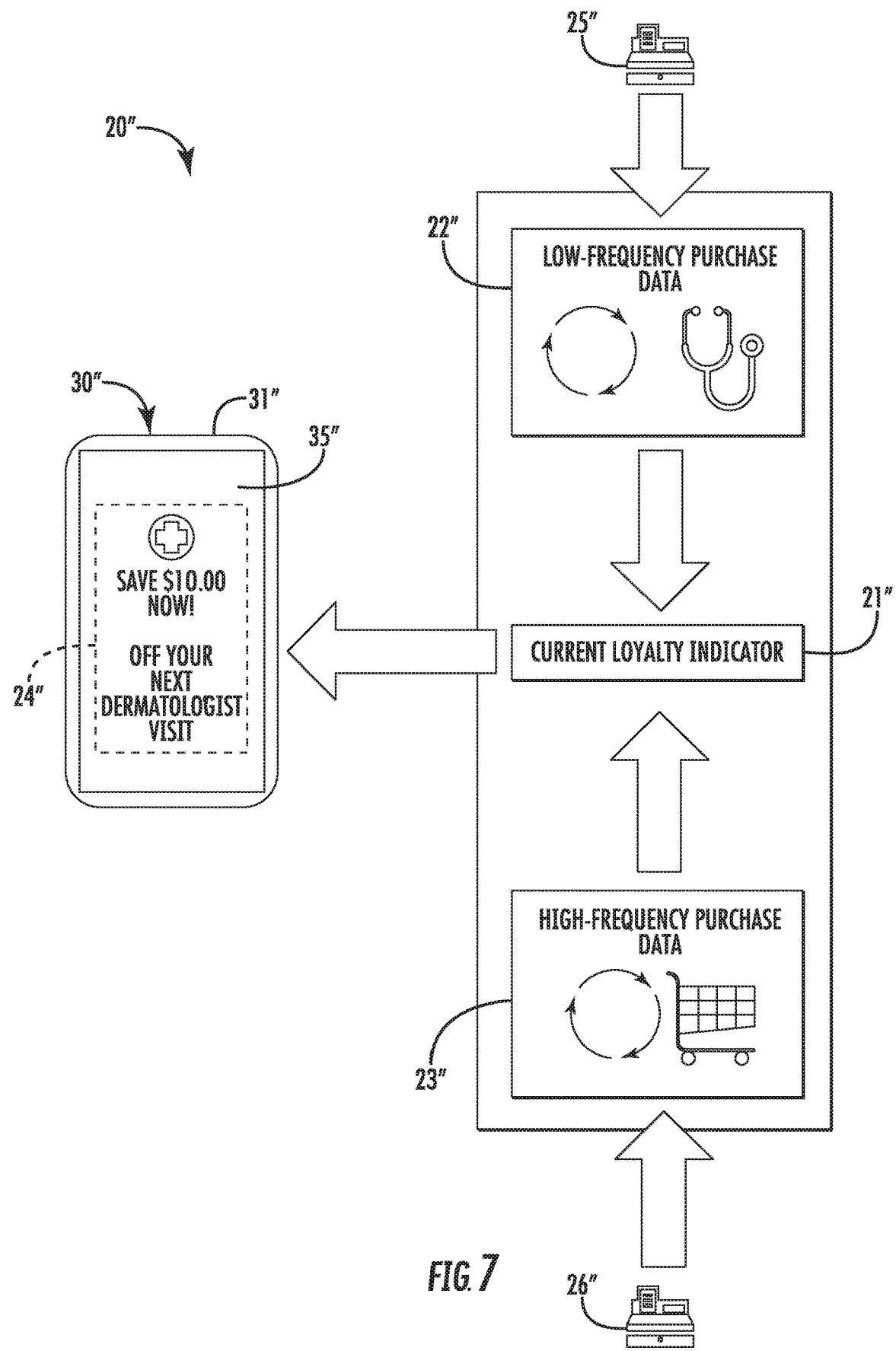
FIG. 7 is a schematic diagram of a digital promotion system in accordance with another embodiment.
Figure 8:
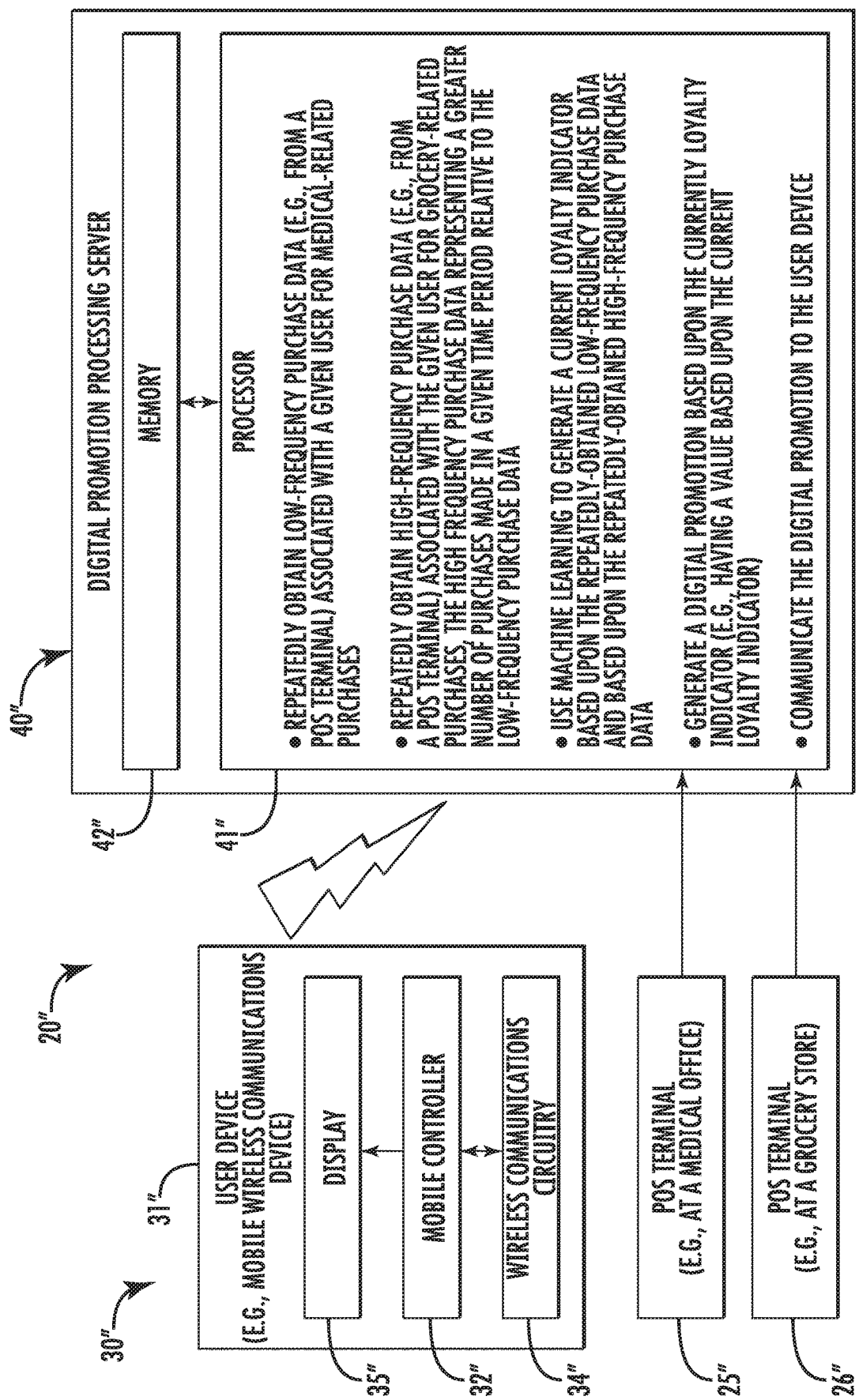
FIG. 8 is a schematic block diagram of the system of FIG. 7.
Figure 9:
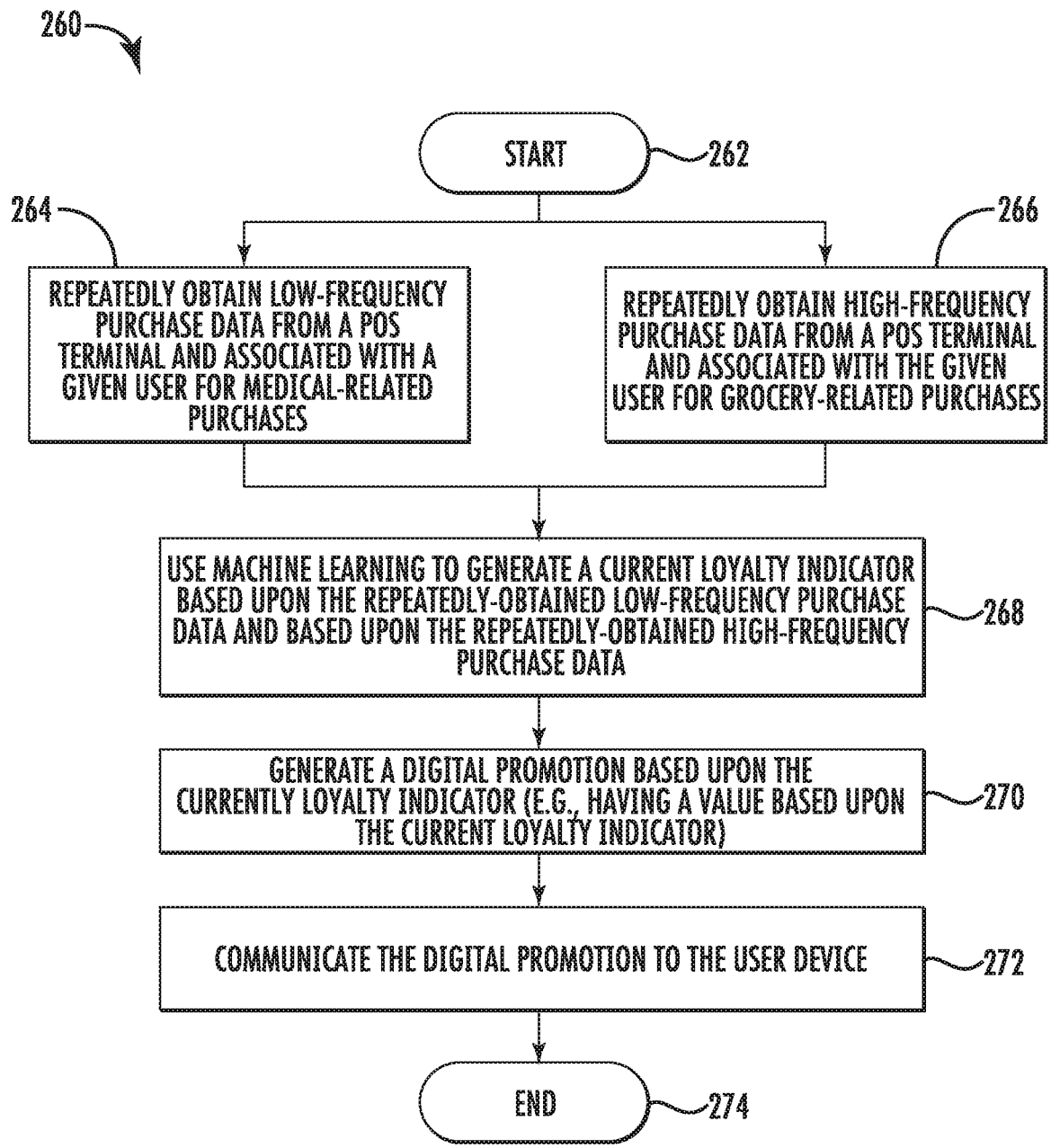
FIG. 9 is a flow chart illustrating operation of the digital promotion processing server of FIG. 8.

Referring now to FIGS. 7-8 and the flowchart 260 in FIG. 9, beginning at Block 262, operations of the digital promotion processing system 20" with respect to another exemplary embodiment of the digital promotion processing server 40" will now be described. At Block 264, the digital promotion processing server 40" repeatedly obtains (e.g., on a per-visit or per-purchase basis) low-frequency purchase data 22" associated with a given user for a first category of purchases. More particularly, the first category of purchases includes medical-related purchases, which are typically made no more than monthly. Accordingly, the low-frequency purchase data 22" for medical-related purchases may include the time and date of a doctor's visit, the type of doctor, the amount spent at doctor (including e.g., out-of-pocket and insurance costs), and/or whether the visit was a sick visit or wellness visit. The low-frequency purchase data 22" may be obtained from a point-of-sale (POS) terminal 25" at a healthcare provider facility (e.g., doctor's office, hospital, urgent care), for example. In some embodiments, medical-related products may alternatively or additionally include medications and/or pharmacy items, such as, for example, over-the-counter medications.

In some embodiments, the digital promotion processing server 40" may determine a user form of communications based upon the low-frequency purchase data 22" For example, those users whose visits are more frequent or whose low-frequency purchase data is associated with an electronic loyalty program, the digital promotion processing server 40" may determine the user form of communications to be a short-message-service (SMS) messages, chatbot communications within a social media application, and/or email. In contrast, an elderly user, determined for example, based upon the low-frequency purchase data 22", may be associated with paper mail as the user form of communications. In other words, the low-frequency purchase data 22" may be mapped to particular user communication preferences, e.g., using machine learning.

The digital promotion processing server 40", at Block 266, repeatedly obtains (e.g., on a per-visit or per-purchase basis) high-frequency purchase data 23" associated with the given user for a second category of purchases different than the first category of purchases. The high-frequency purchase data 23" represents a greater number of purchases made in a given time period relative to the low-frequency purchase data. More particularly, the second category of purchases includes grocery-related purchases, which are typically made at on a weekly basis or more frequent. The high-frequency purchase data 23" associated with the grocery-related purchases may be obtained from a POS terminal 26" at a grocery store, for example, and be associated with the user by way of a loyalty account identifier or other identifier. The high-frequency purchase data 23" may include information about purchased products, such as, for example, product description, price, product identifier, quantity, etc.

At Block 268, the digital promotion processing server 40" uses machine learning to generate a current loyalty indicator 21" based upon the repeatedly-obtained low-frequency purchase data 22" and based upon the repeatedly-obtained high-frequency purchase data 23". More particularly, the digital promotion processing server 40" may learn correlations between the grocery-related purchases and the medical-related purchases. For example, the current loyalty indicator 21" may be representative of a how likely the given user is to purchase automotive services or products, at what value, and with what level of loyalty. Through learning of patterns of grocery shopping and, for example, by way of the brands, types, pricing, and quantity of items purchased at a grocery store, the digital promotion processing server 40" may determine how likely the given user is to purchase a medical product and/or medical services, including the type of medical products and/or services. The current loyalty indicator 21" may be updated by the digital promotion processing server 40" repeatedly, similar to the low-frequency and high-frequency purchase data 22", 23". Those skilled in the art will recognize that by repeatedly obtaining the low-frequency and high-frequency purchase data, and based upon the machine learning, the currently loyalty indicator is being updated, for example, periodically, continually, and/or on a per purchase basis.

The digital promotion processing server 40", at Block 270, generates a digital promotion 24", e.g., a digital coupon, rebate, or redeemable value, such as redeemable points, based upon the current loyalty indicator 21". The digital promotion processing server 40" may determine a value of the digital promotion 24" based upon the current loyalty indicator 21". For example, a current loyalty indicator 21" that is representative (e.g., higher) of a more loyal user or a user more likely to purchase automotive products or services may receive a digital promotion having a higher redeemable value. The digital promotion processing server 40" may alternatively generate the digital promotion 24" to have a lower redeemable value since the given user is more likely to purchase the medical products or services.

Still further, the digital promotion processing server 40" may generate the digital promotion 24" to be redeemable toward a particular product or service based upon the current loyalty indicator 21". For example, the digital promotion processing server 40" may generate a digital promotion 24" that is for a higher valued product or service (e.g., a vanity medical product or service) for a user that has a current loyalty indicator 21" indicative that the user is more likely to purchase the medical products or services.

The digital promotion processing server 40", at Block 272 communicates the digital promotion 24" to the user device or mobile wireless communications 30". Elements of the mobile wireless communications device 30" not specifically described with respect to the present embodiment are similar to the elements described in the above embodiments and need to further discussion herein. The digital promotion processing server 40" may communicate the digital promotion 24" based upon the determined user form of communications, e.g., wirelessly via chatbot, application, SMS message, email, etc.). Operations end at Block 274.

Referring again back to FIG. 1, a method aspect is directed to a method of processing a digital promotion 24. The method includes using a digital promotion processing server 40 to repeatedly obtain low-frequency purchase data 22 associated with a given user for a first category of purchases, and repeatedly obtain high-frequency purchase data 23 associated with the given user for a second category of purchases different than the first category of purchases. The high-frequency purchase data 23 represents a greater number of purchases made in a given time period relative to the low-frequency purchase data 22. The method also includes using the digital promotion processing server 40 to use machine learning to generate a current loyalty indicator 21 based upon the repeatedly-obtained low-frequency purchase data 22 and based upon the repeatedly-obtained high-frequency purchase data 23, and generate a digital promotion 24 based upon the current loyalty indicator and communicate the digital promotion to a user device 30.

A computer readable medium aspect is directed to a non-transitory computer readable medium for processing a digital promotion 24. The non-transitory computer readable medium includes computer executable instructions that when executed by a processor 41 cause the processor to perform operations. The operations include repeatedly obtaining low-frequency purchase data 22 associated with a given user for a first category of purchases and repeatedly obtaining high-frequency purchase data 23 associated with the given user for a second category of purchases different than the first category of purchases. The high-frequency purchase data 23 represents a greater number of purchases made in a given time period relative to the low-frequency purchase data 22. The operations also include using machine learning to generate a current loyalty indicator 21 based upon the repeatedly-obtained low-frequency purchase data 22 and based upon the repeatedly-obtained high-frequency purchase data 23 and generating a digital promotion 24 based upon the current loyalty indicator and communicating the digital promotion to a user device 30.

While several embodiments have been described herein, it should be appreciated by those skilled in the art that any element or elements from one or more embodiments may be used with any other element or elements from any other embodiment or embodiments. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A digital promotion system comprising:
  a user device; and
  a digital promotion processing server configured to use machine learning to
    repeatedly obtain low-frequency purchase data associated with a given user for non-grocery-related purchases purchased at a store other than a grocery store,
    repeatedly obtain high-frequency purchase data associated with the given user for grocery-related purchases purchased at the grocery store, the high-frequency purchase data representing a greater number of purchases made in a given time period relative to the low-frequency purchase data and purchases made on at least a weekly basis, and the high frequency purchase data comprising purchased product brand data, purchased product pricing data, and purchased product quantity data,
    learn correlations between the high-frequency purchase data and the low-frequency purchase data to generate a current loyalty indicator based upon the correlations so that the loyalty indicator is representative of how likely the given user is to make the non-grocery-related purchases,
    update, on an ongoing basis, the current loyalty indicator based upon the learned correlations so that the current loyalty indicator is updated with each iteration of obtaining the repeatedly obtained high-frequency purchase data and with each iteration of obtaining the repeatedly obtained low-frequency purchase data, and
    generate a digital promotion based upon the current loyalty indicator and communicate the digital promotion to the user device.

2. The digital promotion system of claim 1 wherein the non-grocery-related purchases comprise automotive-related purchases.

3. The digital promotion system of claim 1 wherein the non-grocery-related purchases comprise medical-related purchases.

4. The digital promotion system of claim 1 wherein the digital promotion processing server is configured to repeatedly obtain the low-frequency purchase data from at least one point-of-sale (POS) terminal.

5. The digital promotion system of claim 1 wherein the digital promotion processing server is configured to repeatedly obtain the high-frequency purchase data from at least one point-of-sale (POS) terminal.

6. The digital promotion system of claim 1 wherein the digital promotion has a value based upon the current loyalty indicator.

7. The digital promotion system of claim 1 wherein the digital promotion server is configured to learn grocery-related purchase patterns based upon the high-frequency purchase data and generate the loyalty indicator based upon the grocery-related purchase patterns.

8. A digital promotion processing server comprising:
  a processor and an associated memory configured to use machine learning to
    repeatedly obtain low-frequency purchase data associated with a given user for non-grocery-related purchases purchased at a store other than a grocery store,
    repeatedly obtain high-frequency purchase data associated with the given user for grocery-related purchases purchased at the grocery store, the high-frequency purchase data representing a greater number of purchases made in a given time period relative to the low-frequency purchase data and purchases made on at least a weekly basis, and the high frequency purchase data comprising purchased product brand data, purchased product pricing data, and purchased product quantity data, learn correlations between the high-frequency purchase data and the low-frequency purchase data to generate a current loyalty indicator based upon the repeatedly-obtained low-frequency purchase data and based upon the correlations so that the loyalty indicator is representative of how likely the given user is to make the non-grocery-related purchases, update, on an ongoing basis, the current loyalty indicator based upon the learned correlations so that the current loyalty indicator is updated with each iteration of obtaining the repeatedly obtained high-frequency purchase data and with each iteration of obtaining the repeatedly obtained low-frequency purchase data, and generate a digital promotion based upon the current loyalty indicator and communicate the digital promotion to a user device.

9. The digital promotion processing server of claim 8 wherein the non-grocery-related purchases comprise automotive-related purchases.

10. The digital promotion processing server of claim 8 wherein the non-grocery-related purchases comprise medical-related purchases.

11. The digital promotion processing server of claim 8 wherein the processor is configured to learn grocery-related purchase patterns based upon the high-frequency purchase data and generate the loyalty indicator based upon the grocery-related purchase patterns.

12. A method of processing a digital promotion comprising:

using a digital promotion processing server to use machine learning to repeatedly obtain low-frequency purchase data associated with a given user for non-grocery-related purchases purchased at a store other than a grocery store, repeatedly obtain high-frequency purchase data associated with the given user for grocery-related purchases made at the grocery store, the high-frequency purchase data representing a greater number of purchases made in a given time period relative to the low-frequency purchase data and purchases made on at least a weekly basis, and the high frequency purchase data comprising purchased product brand data, purchased product pricing data, and purchased product quantity data, learn correlations between the high-frequency purchase data and the low-frequency purchase data to generate a current loyalty indicator based upon the correlations so that the loyalty indicator is representative of how likely the given user is to make the non-grocery-related purchases, update, on an ongoing basis, the current loyalty indicator based upon the learned correlations so that the current loyalty indicator is updated with each iteration of obtaining the repeatedly obtained high-frequency purchase data and with each iteration of obtaining the repeatedly obtained low-frequency purchase data, and generate a digital promotion based upon the current loyalty indicator and communicate the digital promotion to a user device.

13. The method of claim 12 wherein the non-grocery-related purchases comprise automotive-related purchases.

14. The method of claim 12 wherein the non-grocery-related purchases comprise medical-related purchases.

15. The method of claim 12 wherein using the digital promotion processing server comprises using the digital promotion processing server to learn grocery-related purchase patterns based upon the high-frequency purchase data and generate the loyalty indicator based upon the grocery-related purchase patterns.

16. A non-transitory computer readable medium for processing a digital promotion, the non-transitory computer readable medium comprising computer executable instructions that when executed by a processor cause the processor to perform operations comprising:

using machine learning for repeatedly obtaining low-frequency purchase data associated with a given user for non-grocery-related purchases made at a store other than a grocery store, repeatedly obtaining high-frequency purchase data associated with the given user for grocery-related purchases made at the grocery store, the high-frequency purchase data representing a greater number of purchases made in a given time period relative to the low-frequency purchase data and purchases made on at least a weekly basis, and the high frequency purchase data comprising purchased product brand data, purchased product pricing data, and purchased product quantity data, learning correlations between the high-frequency purchase data and the low-frequency purchase data to generate a current loyalty indicator based upon the correlations so that the loyalty indicator is representative of how likely the given user is to make the non-grocery-related purchases, updating, on an ongoing basis, the current loyalty indicator based upon the learned correlations so that the current loyalty indicator is updated with each iteration of obtaining the repeatedly obtained high-frequency purchase data and with each iteration of obtaining the repeatedly obtained low-frequency purchase data, and generating a digital promotion based upon the current loyalty indicator and communicating the digital promotion to a user device.

17. The non-transitory computer readable medium of claim 16 wherein the non-grocery-related purchases comprise automotive-related purchases.

18. The non-transitory computer readable medium of claim 16 wherein the grocery-related purchases comprise medical-related purchases.

19. The non-transitory computer readable medium of claim 16 wherein the operations comprise learning grocery-related purchase patterns based upon the high-frequency purchase data and generate the loyalty indicator based upon the grocery-related purchase patterns.

* * * * *